US012319281B2

(12) United States Patent
Cordeiro

(10) Patent No.: US 12,319,281 B2
(45) Date of Patent: Jun. 3, 2025

(54) VEHICULAR RADAR SYSTEM FOR PREDICTING LANES USING SMART CAMERA INPUT

(71) Applicant: Magna Electronics Inc., Auburn Hills, MI (US)

(72) Inventor: Alan M. Cordeiro, Farmington Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 228 days.

(21) Appl. No.: 18/155,089

(22) Filed: Jan. 17, 2023

(65) Prior Publication Data

US 2023/0234583 A1  Jul. 27, 2023

Related U.S. Application Data

(60) Provisional application No. 63/267,203, filed on Jan. 27, 2022.

(51) Int. Cl.
*B60W 30/12* (2020.01)
*B60W 30/18* (2012.01)

(52) U.S. Cl.
CPC ...... *B60W 30/12* (2013.01); *B60W 30/18163* (2013.01); *B60W 2420/403* (2013.01); *B60W 2420/408* (2024.01); *B60W 2552/53* (2020.02)

(58) Field of Classification Search
CPC .......... B60W 30/12; B60W 30/18163; B60W 2420/403; B60W 2420/408; B60W 2552/53; B60W 50/023; B60W 2050/0295; B60W 50/029
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 9,274,525 B1 * | 3/2016 | Ferguson | B60W 10/18 |
| 9,481,365 B2 * | 11/2016 | Tokoro | B60W 30/0956 |
| 9,542,846 B2 * | 1/2017 | Zeng | G08G 1/09626 |
| 9,946,940 B2 | 4/2018 | Gupta et al. | |
| 10,055,651 B2 | 8/2018 | Chundrlik, Jr. et al. | |

(Continued)

FOREIGN PATENT DOCUMENTS

WO    WO-2009013052 A2 *  1/2009  ............ B60W 30/12

*Primary Examiner* — Phutthiwat Wongwian
*Assistant Examiner* — Brian R Kirby
(74) *Attorney, Agent, or Firm* — HONIGMAN LLP

(57) ABSTRACT

A vehicular sensing system includes a camera and a radar sensor disposed at a vehicle. The system, responsive to processing of radar data captured by the radar sensor, determines an edge of a road the vehicle is traveling along. Responsive to processing of image data captured by the camera, location of a lane marking of the road is determined. As the vehicle travels along the road, the system, responsive to failing to determine the location of the lane marking of the road via processing of the image data captured by the camera, predicts the location of the lane marking of the road based on the radar data. The vehicle is controlled based in part on the predicted location of the lane marking of the road.

22 Claims, 2 Drawing Sheets

(56) References Cited

U.S. PATENT DOCUMENTS

| | | | |
|---|---|---|---|
| 10,071,687 B2 | 9/2018 | Ihlenburg et al. | |
| 10,099,614 B2 | 10/2018 | Diessner | |
| 10,268,904 B2 | 4/2019 | Gupta | |
| 10,449,899 B2 | 10/2019 | Gupta et al. | |
| 10,816,666 B2 | 10/2020 | Nicke et al. | |
| 10,906,554 B2 | 2/2021 | Smid et al. | |
| 12,071,150 B2 * | 8/2024 | Cordeiro et al. | |
| 2003/0105578 A1 * | 6/2003 | Takenaga | G08G 1/167 340/995.13 |
| 2005/0083432 A1 * | 4/2005 | Honda | H04N 23/70 348/E5.037 |
| 2012/0062743 A1 * | 3/2012 | Lynam | B60Q 9/005 348/148 |
| 2012/0283912 A1 * | 11/2012 | Lee | B62D 1/286 701/41 |
| 2014/0118182 A1 * | 5/2014 | Oh | G01S 13/867 342/52 |
| 2014/0309884 A1 * | 10/2014 | Wolf | G05D 1/0214 701/41 |
| 2016/0162743 A1 * | 6/2016 | Chundrlik, Jr. | G06T 7/277 348/148 |
| 2016/0171893 A1 * | 6/2016 | Chen | G08G 1/0112 701/300 |
| 2018/0024238 A1 * | 1/2018 | Khlifi | G01S 13/931 342/52 |
| 2018/0120859 A1 * | 5/2018 | Eagelberg | G05D 1/0088 |
| 2020/0026282 A1 * | 1/2020 | Choe | G05D 1/0257 |
| 2023/0008230 A1 | 1/2023 | Cordeiro et al. | |
| 2023/0090300 A1 * | 3/2023 | Motegi | G06V 20/588 382/104 |

* cited by examiner

VEHICULAR RADAR SYSTEM FOR PREDICTING LANES USING SMART CAMERA INPUT

CROSS REFERENCE TO RELATED APPLICATION

The present application claims the filing benefits of U.S. provisional application Ser. No. 63/267,203, filed Jan. 27, 2022, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors and one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular sensing system includes a camera disposed at a vehicle equipped with the vehicular sensing system that views exterior of the vehicle. The camera captures image data. The system includes a radar sensor disposed at the vehicle that senses exterior of the vehicle. The radar sensor captures radar data. The camera may include a CMOS imaging array that includes at least one million photosensors arranged in rows and columns. The system includes an electronic control unit (ECU) with electronic circuitry and associated software. The electronic circuitry of the ECU includes at least one data processor. Image data captured by the camera and radar data captured by the radar sensor is processed at the ECU. The system, responsive to processing at the ECU of radar data captured by the radar sensor, determines an edge of a road along which the vehicle is traveling. The system, responsive to processing at the ECU of image data captured by the camera, determines location of a lane marking of a traffic lane of the road along which the vehicle is traveling. When the vehicular fails to determine the location of the lane marking of the traffic lane on the road along which the vehicle is traveling based on processing at the ECU of the image data captured by the camera, and responsive to failing to determine the location of the lane marking of the traffic lane on the road along which the vehicle is traveling based on processing at the ECU of the image data captured by the camera, the system predicts the location of the lane marking of the road based on the radar data. The vehicle is controlled based at least in part on the predicted location of the lane marking of the road.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
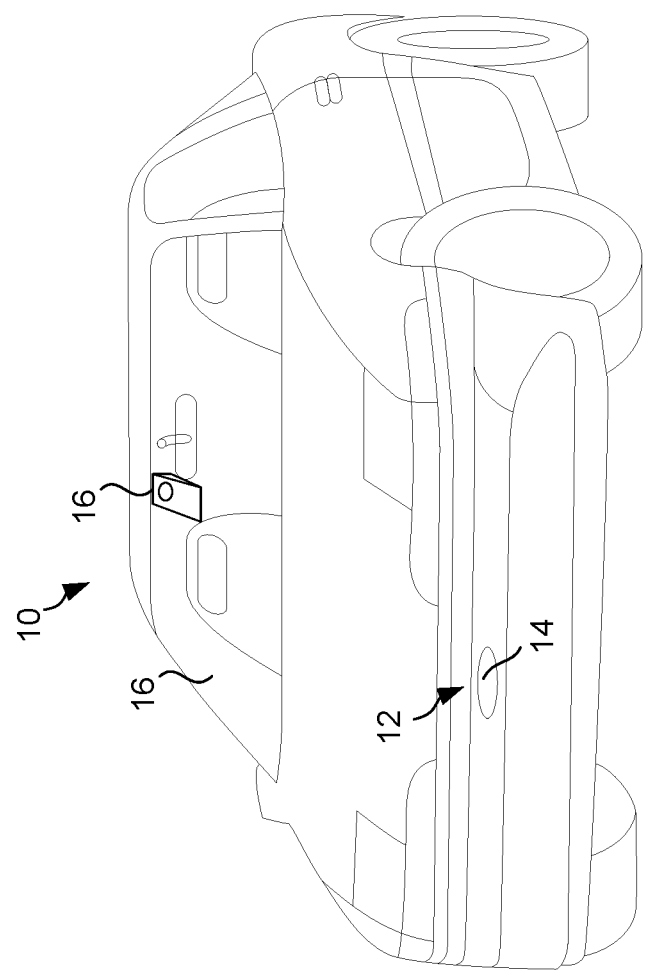
FIG. 1 is a perspective view of a vehicle with a sensing system that incorporates a radar sensor and a camera.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) that includes a data processor that is operable to process data captured by the radar sensor(s). The sensing system may also include a radar sensor that includes plurality of transmitters that transmit radio signals via plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controls at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

The vehicle 10 includes at least one exterior viewing imaging sensor or camera 16, such as a forward viewing imaging sensor or camera, which may be disposed at and behind the windshield 18 of the vehicle and viewing forward through the windshield so as to capture image data representative of the scene occurring forward of the vehicle. Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The ECU may have a data processor or image processor that is operable to process image data captured by the camera or cameras, whereby the ECU may detect or determine presence of objects, lane markings and/or the like and/or the system provide displayed images at a display device for viewing by the driver of the vehicle.

Radar modules are routinely used as sensor input for advanced driver assistance systems (ADAS). Some systems include additional sensor input. For example, other sources of sensor input may include intelligent camera modules (e.g., a front camera module (FCM)) and/or LIDAR. While cameras and LIDAR can detect road lane markings, radar modules generally cannot. However, radar is able to detect edges of a road (e.g., the edges of the paved surface where there is a boundary between the paved surface and the unpaved surface) or, in some cases, when there is a solid wall or guardrail present adjacent the traffic lane.

A training algorithm may be set up to continuously learn the center of the current lane that the vehicle is traveling along with respect to the road edges on either side of the vehicle, and this information may be used to predict the center of the current traveled lane when sensor information from other sensors is temporarily lost (e.g., when reliable camera information is lost for brief period of time when the sun shines directly into the camera or other inclement weather such as fog, snow, and/or rain inhibits the view of one or more sensors). The algorithm may tolerate sudden brief changes in road width created by entrances and exits to the main road.

Implementations herein include a sensing system that includes a controller (e.g., an ECU or other processor) that executes a training algorithm to continuously receive lane marking inputs from one or more intelligent camera modules (e.g., the camera 16) supplying information pertaining to where the vehicle is with respect to the lane the vehicle is currently travelling in. This information may include the estimated curvature of the lane and/or other road information (e.g., estimated road width). The controller may continuously receive inputs from one or more radar modules supplying information on how far the edge of the road is on each side of the vehicle (i.e., a distance to the edge of the road relative to the vehicle) and/or an estimate of the curvature of these road edges.

When lane marking information is supplied from more than one camera or other imaging sensor (e.g., multiple forward viewing cameras and/or one or more side or rear-view cameras), the information is combined before use (e.g., via fusion using a Kalman filter or the like). Similarly, when road edge information is received from more than one radar module, this information may be combined before it is used to train the lane estimation algorithm. The cameras may determine the nature of the road edge boundary (i.e., classify the road edge boundary) on each side (e.g. solid wall, metal guard rail, or a simple end of paved surface and a start of an un-paved surface) and use this information in the training of the estimation algorithm as well.

Figure 2:
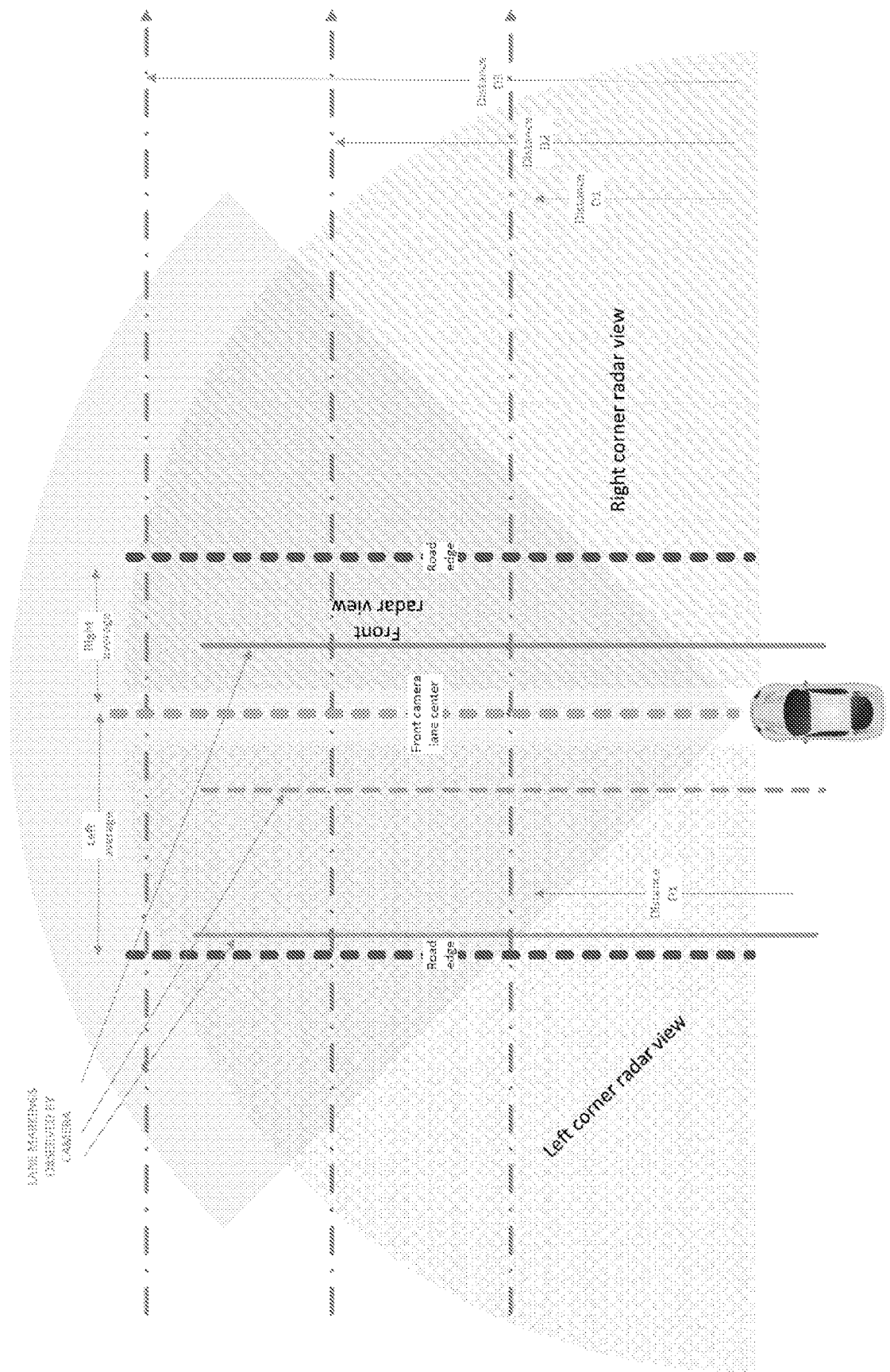
FIG. 2 is a schematic view of fields of sensing of radar sensors and a camera of the system of FIG. 1.

Referring now to FIG. 2, a learning algorithm executing on the controller (or a central control module or any other processor disposed within the vehicle) may continuously generate or create a model of the road lane mapping with respect to the road edge information on each side of the vehicle based on radar data captured by one or more radar sensors. In many cases the road edge may not be straight, therefore the road edge distances from the vehicle may be measured at multiple distances from the vehicle, such as illustrated by D1, D2, and D3 in FIG. 2. For example, the read edge distances from the vehicle may be measured at a distance of 10 meters from the vehicle, 20 meters from the vehicle, and 30 meters or more from the vehicle). The distances may be dependent upon a current speed of the vehicle and/or other environmental conditions surrounding the vehicle (e.g., weather, other traffic, road type, etc.). The distances may be dependent a type and/or quality and/or confidence of the sensors disposed at the vehicle. In this example, the information may be used to determine the curvature of the road up to distance D3 in front of the vehicle (e.g., by comparing the position of the edge of the road at the different distances from the vehicle), and, using extrapolation, a short distance further than D3.

By superimposing the lane marking information from the front camera onto the radar model generated via the radar data captured by the radar sensors, the radar model continues to learn where the lane markings are with respect to the road edges. That is, the camera information is used to train (e.g., via supervised learning) the radar model (e.g., a machine learning model such as a neural network). In the event of a sudden loss of front camera information (e.g., from mechanical or electrical failure, environmental conditions, etc.), the radar model continues to predict the position of the lane markings ahead of the vehicle based on the location of the road edges at either side of the vehicle. Optionally, in the absence of new camera information (e.g., the cameras or other image sensors are temporarily disabled or unreliable), the radar model assumes that the lane markings continue with the same marking patterns (e.g., number of lanes, lane width, curvature, etc.) that were present prior to loss of camera information. The model may learn to correct for sudden changes of road width such as those created by entry and exiting lanes from the regular road pattern.

As shown in FIG. 2, in some examples, there are four or more sensors receiving information on the road surroundings ahead of the vehicle as the vehicle travels along a traffic lane. For example, 1) a front camera or forward viewing camera with an image view of the road greater and 90 degrees, 2) a front (center) sensing or pointing radar sensor with a horizontal view greater than 90 degrees, 3) a forward-left sensing or pointing corner radar with part of its view overlapping the front radar, and/or 4) a forward-right sensing or pointing corner radar with part of its view overlapping the front radar.

Optionally, the system maintains a rolling average of numbers for the distance of each road edge to the center of the current traffic lane (i.e., a left average providing the average distance between the center of the current traffic lane to the left edge of the traffic lane and a right average providing the average distance between the center of the current traffic lane to the right edge of the traffic lane). The rolling averages will continue to be updated when, for example, the front camera lane marking confidence is greater than a threshold value (e.g., 40%) and/or lane curvature is very low (e.g., a radius of curvature greater than a threshold amount).

Road edge offsets from the vehicle coordinates may be determined at multiple locations whenever possible, and the system may use as many radar sensors as available that provide sensor information representative of these locations. For example, when the system is equipped with both front and corner radar sensors that have fields of sensing that include respective locations, the two values from each sensor may be fused.

When processing of image data captured by the front camera detects a presence of a guard rail on either side of the lane the vehicle is travelling along, the system may adjust accordingly. Optionally, road averaging may be suspended when, for example, lane exits and entrances appear in the near horizon (i.e., within a threshold distance of the vehicle). That is, the system may temporarily halt or pause the rolling average when the lanes temporarily widen due to entrances/exits to preserve the integrity of the rolling averages. The road averaging may resume after the exits/entrances are past. The predicted current lane centerline based on radar sensor data may then be based on a fusion of the left average and the right average. The fusion will include the curvature (e.g., the clothoid) information from each side road edge.

Thus, implementations herein include a sensor system or radar system or driver assist system that includes one or more radar sensors and one or more cameras. The radar sensors capture reflected radar signals and, based on the received signals, determine edges or boundaries of the lane or road the vehicle is traveling along. Based on training from image data captured by a camera, a radar model learns (using the radar data and the image data) to predict a location of lane boundary markings relative to the vehicle and/or the edge the road. When image data is interrupted (e.g., a brief interruption from environmental conditions), the radar model may predict the location of the lane markings, allowing one or more driver assist systems (e.g., lane keeping systems) to continue operation for a threshold period of time. The system may predict or rely upon predicted lane markings for only the threshold period of time and/or a threshold period of distance (i.e., the distance the vehicle has traveled while relying upon predicted lane markings). For example, when the image data from the camera is interrupted for longer than the threshold period of time, the system may disengage (e.g., with appropriate warnings to the occupants) any systems relying on predictions from the radar model to ensure that the predictions do not become stale from lack of recent image data.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCCC (red, clear, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140;

US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:
 a camera disposed at a vehicle equipped with the vehicular sensing system and viewing exterior of the vehicle, the camera capturing image data;
 a radar sensor disposed at the vehicle and sensing exterior of the vehicle, the radar sensor capturing radar data;
 wherein the camera comprises a CMOS imaging array, and wherein the CMOS imaging array comprises at least one million photosensors arranged in rows and columns;
 an electronic control unit (ECU) comprising electronic circuitry and associated software;
 wherein the electronic circuitry of the ECU comprises at least one data processor;
 wherein image data captured by the camera and radar data captured by the radar sensor is processed at the ECU;
 wherein the vehicular sensing system, responsive to processing at the ECU of radar data captured by the radar sensor, determines an edge of a road along which the vehicle is traveling;
 wherein the vehicular sensing system, responsive to processing at the ECU of image data captured by the camera, determines location of a lane marking of a traffic lane of the road along which the vehicle is traveling;
 wherein the vehicular sensing system, after determining location of the lane marking of the traffic lane of the road along with the vehicle is traveling, and responsive to failing to determine a location of a subsequent lane marking of the traffic lane on the road along which the vehicle is traveling via processing at the ECU of the image data captured by the camera, predicts the location of the subsequent lane marking of the road based on the determined edge of the road along which the vehicle is traveling and the location of the lane marking determined prior to failing to determine the location of the subsequent lane marking; and
 wherein the vehicle is controlled based at least in part on the predicted location of the lane marking of the road.

2. The vehicular sensing system of claim 1, wherein the camera views at least forward of the vehicle with a field of view greater than 90 degrees.

3. The vehicular sensing system of claim 1, wherein the radar sensor comprises a front center radar sensor with a field of sensing greater than 90 degrees.

4. The vehicular sensing system of claim 3, further comprising at least one corner radar sensor with a field of sensing that at least partially overlaps the field of sensing of the front center radar sensor.

5. The vehicular sensing system of claim 4, wherein the at least one corner radar sensor comprises a left front corner radar sensor and a right front corner radar sensor.

6. The vehicular sensing system of claim 1, wherein the vehicular sensing system, responsive to processing by the ECU of image data captured by the camera, estimates a curvature of the road along which the vehicle is traveling.

7. The vehicular sensing system of claim 1, wherein the vehicular sensing system, responsive to processing by the ECU of radar data captured by the radar sensor, estimates a curvature of the road along which the vehicle is traveling.

8. The vehicular sensing system of claim 7, wherein the vehicular sensing system estimates the curvature of the road the vehicle is traveling along based on determining the edge of the road along which the vehicle is traveling at a plurality of different distances in front of the vehicle.

9. The vehicular sensing system of claim 1, wherein the vehicular sensing system halts controlling the vehicle after the vehicle has been controlled for a threshold period of time based at least in part on the predicted location of the lane marking of the road.

10. The vehicular sensing system of claim 1, wherein the vehicular sensing system halts controlling the vehicle after the vehicle has been controlled for a threshold distance based at least in part on the predicted location of the lane marking of the road.

11. The vehicular sensing system of claim 1, wherein the vehicular sensing system determines a rolling average of distance between a center of the traffic lane of the road along which the vehicle is traveling and the determined edge of the traffic lane, and wherein the vehicular sensing system predicts the location of the lane marking of the traffic lane of the road based on the determined rolling average.

12. The vehicular sensing system of claim 11, wherein the vehicular sensing system temporarily ceases determining the rolling average of distance between the center of the traffic lane of the road along which the vehicle is traveling and the determined edge of the traffic lane responsive at least in part to determination of a temporary widening of the traffic lane at an exit ramp or an entry ramp.

13. The vehicular sensing system of claim 1, wherein the vehicular sensing system predicts the location of the lane marking of the road using a model.

14. The vehicular sensing system of claim 13, wherein the model is trained using the determined location of the lane marking.

15. A vehicular sensing system, the vehicular sensing system comprising:
- a camera disposed at an in-cabin side of a windshield of a vehicle equipped with the vehicular sensing system and viewing at least forward of the vehicle, the camera capturing image data;
- a plurality of radar sensors disposed at the vehicle and sensing at least forward of the vehicle, the plurality of radar sensors capturing radar data, and wherein the plurality of radar sensors comprises a front center radar sensor, a left front corner radar sensor with a field of sensing that at least partially overlaps a field of sensing of the front center radar sensor, and a right front corner radar sensor with a field of sensing that at least partially overlaps the field of sensing of the front center radar sensor;
- wherein the camera comprises a CMOS imaging array, and wherein the CMOS imaging array comprises at least one million photosensors arranged in rows and columns;
- an electronic control unit (ECU) comprising electronic circuitry and associated software;
- wherein the electronic circuitry of the ECU comprises at least one data processor;
- wherein image data captured by the camera and radar data captured by the plurality of radar sensors is processed at the ECU;
- wherein the vehicular sensing system, responsive to processing at the ECU of radar data captured by the plurality of radar sensors, determines an edge of a road along which the vehicle is traveling;
- wherein the vehicular sensing system, responsive to processing at the ECU of image data captured by the camera, determines location of a lane marking of a traffic lane of the road along which the vehicle is traveling;
- wherein the vehicular sensing system, responsive to processing by the ECU of image data captured by the camera, estimates a curvature of the road along which the vehicle is traveling;
- wherein the vehicular sensing system, after determining location of the lane marking of the traffic lane of the road along with the vehicle is traveling, and responsive to failing to determine a location of a subsequent lane marking of the traffic lane on the road along which the vehicle is traveling via processing at the ECU of the image data captured by the camera, predicts the location of the subsequent lane marking of the road based on (i) the determined edge of the road along which the vehicle is traveling, (ii) the estimated curvature of the road along with the vehicle is traveling and (iii) the location of the lane marking determined prior to failing to determine the location of the subsequent lane marking; and
- wherein the vehicle is controlled based at least in part on the predicted location of the lane marking of the road.

16. The vehicular sensing system of claim 15, wherein the camera views at least forward of the vehicle with a field of view greater than 90 degrees.

17. The vehicular sensing system of claim 15, wherein the front center radar sensor has a field of sensing greater than 90 degrees.

18. The vehicular sensing system of claim 15, wherein the vehicular sensing system halts controlling the vehicle after the vehicle has been controlled for a threshold period of time based at least in part on the predicted location of the lane marking of the road.

19. The vehicular sensing system of claim 15, wherein the vehicular sensing system estimates the curvature of the road the vehicle is traveling along based on determining the edge of the road along which the vehicle is traveling at a plurality of different distances in front of the vehicle.

20. A vehicular sensing system, the vehicular sensing system comprising:
- a camera disposed at an in-cabin side of a windshield of a vehicle equipped with the vehicular sensing system and viewing at least forward of the vehicle, the camera capturing image data;
- a radar sensor disposed at the vehicle and sensing at least forward of the vehicle, the radar sensor capturing radar data;
- wherein the camera comprises a CMOS imaging array, and wherein the CMOS imaging array comprises at least one million photosensors arranged in rows and columns;
- an electronic control unit (ECU) comprising electronic circuitry and associated software;
- wherein the electronic circuitry of the ECU comprises at least one data processor;
- wherein image data captured by the camera and radar data captured by the radar sensor is processed at the ECU;
- wherein the vehicular sensing system, responsive to processing at the ECU of radar data captured by the radar sensor, determines an edge of a road along which the vehicle is traveling;
- wherein the vehicular sensing system, responsive to processing at the ECU of image data captured by the camera, determines location of a lane marking of a traffic lane of the road along which the vehicle is traveling;
- wherein the vehicular sensing system trains a machine learning model based on (i) the edge of the road along with the vehicle is traveling and (ii) the determined location of the lane marking of the traffic lane of the road along which the vehicle is traveling, and wherein the machine learning model comprises a neural network;
- wherein the vehicular sensing system, after determining location of the lane marking of the traffic lane of the road along with the vehicle is traveling, and responsive to failing to determine a location of a subsequent lane marking of the traffic lane on the road along which the vehicle is traveling via processing at the ECU of the image data captured by the camera, predicts the location of the subsequent lane marking of the road based at least in part on the trained machine learning model; and wherein the vehicle is controlled based at least in part on the predicted location of the lane marking of the road.

21. The vehicular sensing system of claim 20, wherein the vehicular sensing system determines a rolling average of distance between a center of the traffic lane of the road along which the vehicle is traveling and the determined edge of the traffic lane, and wherein the vehicular sensing system predicts the location of the lane marking of the traffic lane of the road based on the determined rolling average.

22. The vehicular sensing system of claim 21, wherein the vehicular sensing system temporarily ceases determining the rolling average of distance between the center of the traffic lane of the road along which the vehicle is traveling and the determined edge of the traffic lane responsive at least in part to determination of a temporary widening of the traffic lane at an exit ramp or an entry ramp.

* * * * *